United States Patent [19]

Wyser

[11] Patent Number: 5,488,985
[45] Date of Patent: Feb. 6, 1996

[54] VALVE ASSEMBLY FOR VENTING DIECASTING MOULDS

[75] Inventor: Johann Wyser, Ligerz, Switzerland

[73] Assignee: Fondarex, F. Hodler & Cie. S.A., Chailly sur Montreux, Switzerland

[21] Appl. No.: 190,275

[22] Filed: Feb. 2, 1994

[30] Foreign Application Priority Data

Feb. 2, 1993 [DE] Germany .......................... 43 02 798.9

[51] Int. Cl.⁶ ..................................................... B22D 17/00
[52] U.S. Cl. ........................................... 164/305; 164/410
[58] Field of Search ..................................... 164/305, 410; 425/420, 812, 810

[56] References Cited

U.S. PATENT DOCUMENTS 4,239,080 12/1980 Hodler ....................................... 164/305
4,722,385 2/1988 Yamauchi et al. ....................... 164/305

FOREIGN PATENT DOCUMENTS

1154931 10/1979 Canada .
2433139 1/1976 Germany .
61-266168 11/1986 Japan .
63-93462 4/1988 Japan .
63-256252 10/1988 Japan .

Primary Examiner—P. Austin Bradley
Assistant Examiner—Randy Herrick
Attorney, Agent, or Firm—Tarolli, Sundheim & Covell

[57] ABSTRACT

A valve assembly for venting diecasting moulds comprises a venting channel, a venting valve communicating with the venting channel and having an axially displaceable valve closure member, and an actuating member for operating the venting valve from an open position into a closed position. The actuating member includes a power pick up member exposed to the liquid casting material escaping during the casting operation from a casting chamber provided in the diecasting mould through the venting channel and being axially displaceable under the influence of the kinetic energy transmitted from the liquid casting material to the power pick up member when the liquid casting material hits the power pick up member. The power pick up member is mechanically coupled to the axially displaceable valve closure member and includes an axially displaceable push member having an operating stroke whose length is limited to only a fraction of the length of the stroke performed by the axially displaceable valve closure member when it is driven from its open position to its closed position. The axially displaceable valve closure member freely moves along a path in addition to the operating stroke of the power pick up member. The actuating member further comprises a power transmission member for the transmission of the impact force exerted by the liquid casting material onto the power pick up member to the axially displaceable valve closure member of the venting valve.

16 Claims, 6 Drawing Sheets

VALVE ASSEMBLY FOR VENTING DIECASTING MOULDS

BACKGROUND OF THE INVENTION

1. Field of the Invention

The present invention refers to a valve assembly for venting diecasting moulds. The valve assembly comprises a venting channel, a venting valve communicating with the venting channel and having an axially displaceable valve closure member, and an actuating member for operating the venting valve from an open position into a closed position.

The actuating member includes a power pick up member exposed to the liquid casting material escaping during the casting operation from a casting chamber provided in the diecasting mould through the venting channel and being axially displaceable under the influence of the kinetic energy transmitted from the liquid casting material to the power pick up member when the liquid casting material hits the power pick up member. The power pick up member is mechanically coupled to the axially displaceable valve closure member and it includes an axially displaceable push member.

2. Prior Art

Valve assemblies of this kind normally are mounted on one of the two portions of a diecasting mould, said two portions contacting each other along a separating plane when the mould is in its initial position ready for a casting operation. Usually, the design is such that one of the mould portions comprises a recess near its edge whereby the valve assembly is mounted in this recess such that its front surface flushes with the above mentioned separating plane; thus, the front surface of the valve assembly sealingly contacts the front surface of the other mould portion when the two mould portions are assembled, i.e. the diecasting mould is closed. The venting channel of the valve assembly is open towards the above mentioned front surface and forms a continuation of the venting channel of the diecasting mould which is, as well, open to said front surface.

The end of the venting channel of the valve assembly leading to the atmosphere is either open or connected to a vacuum pump means. The vacuum pump means thereby serves to remove the air contained in the casting chamber of the mould when the liquid casting material is filled into the mould under high pressure and with high velocity.

Once the venting process has come to an end, the venting valve assembly closes to prevent the liquid casting material from flowing out of the mould or into the vacuum pump connected to the venting channel. The closing of the valve assembly is initiated by means of the liquid casting material flowing into the venting channel of the valve assembly. For this purpose, according to prior art, an impact or dynamic pressure built-up in the interior of the valve assembly under the influence of the liquid casting material flowing into the mould is used to close the venting valve. In view of the fact that the liquid casting material flows into the mould under very high pressure and, after having filled the casting chamber of the mould, flows with the same high pressure and speed into the venting channel of the valve assembly towards the venting valve, the operation of the venting valve must be initiated with a very small time lag in order to ensure that the closing operation of the venting valve has come to an end before the liquid casting material has reached the venting valve. It is of paramount importance that the liquid casting material is prevented from penetrating the interior of the venting valve because, in such a case, the venting valve would be blocked.

Experiences with such valve assemblies have shown that it is possible to realize an operation of the venting valve with a time lag of extremely short duration (i.e. less than 1 msec) if the means for transmitting the above mentioned dynamic or impact pressure to an actuating force of the venting valve are appropriately designed; thus, a reliable operation of such a venting valve can be ensured.

The Swiss Patent Nr. 633,208 discloses a venting valve assembly of the kind mentioned above which is intended to be used in connection with a high pressure diecasting operation and which, generally speaking, operates quite well. In fact, this valve assembly comprises a plunger valve member whose central axis runs perpendicular to the front surface of the valve assembly, including a valve cylinder communicating with the venting channel and a valve piston displaceable in the valve cylinder. The valve piston is provided with a piston head which projects at the front side of the valve assembly into the venting channel if the valve assembly is open, and which is displaced into the interior of the valve cylinder if the valve assembly is closed.

Further, there is provided an actuating assembly including a power pick up member in the form of a piston-cylinder-arrangement having an operating cylinder communication with a portion of the venting channel which lies in front of the valve cylinder as seen in the direction of flow of the liquid casting material. The operating cylinder comprises a piston member which is exposed to the liquid casting material flowing into the venting channel. The operating cylinder of the actuating assembly and the valve cylinder of the plunger valve member are located in parallel axial relationship, and the piston member of the actuating assembly is connected to the valve piston such that the piston member of the actuating assembly, once having been exposed to the liquid casting material and accelerated to a backward motion, effects a displacement of the valve piston in the sense of a closing of the venting valve.

In the design according to the above mentioned Swiss Patent Nr. 633,208, the piston member of the actuating assembly is connected to the valve piston either directly or via a driver member whereby said driver member is displaced along a path running parallel with the path of motion of the valve piston. According to a variant of this design, it is provided that the piston member of the actuating member is non-positively coupled to the driver member. In any case, however, the path along which the piston member of the actuating assembly is displaced is the same as the path of the valve piston; in practice, this path amounts to 5–10 mm. This circumstance has proven to be disadvantageous in several respects.

Under the impact or shock of the liquid casting material hitting the piston member of the actuating assembly, the mass set in motion (i.e. the piston member of the actuating assembly, the driver member and the valve piston) includes quite a high amount of kinetic energy at the end of the path of motion which must be absorbed at the end of the path of motion by decelerating the moved mass. A rigid stop member probably could lead to a deterioration of the whole valve assembly. Thus, it is required that suitable shock absorbing means be provided which, in turn, require a high expenditure, especially if the time or the path during which the mass has to be decelerated is relatively short. In this connection, it must be pointed out that the plunger piston of the venting valve has a well defined path to run until it is in its predefined closing position. If this path of displacement is increased during the process of deceleration, even during a very short period, the liquid casting material can penetrate the valve cylinder with the result that the operation of the venting valve is severely disturbed or even made impossible.

On the other hand, during the operation of the piston member of the actuating assembly, a portion of the cylinder wall of the actuating cylinder is exposed to the liquid casting material. This freely exposed portion of the cylinder wall has the same length as the operating stroke of the piston member. Thus, the liquid casting material penetrating the actuating cylinder forms, after its solidification, a plug which can be jammed in the actuating cylinder. Due to its length, its removal out of the cylinder bore is difficult and requires a great force. The result is that the two part mould cannot be opened easily and that the surface of the cylinder of the actuating assembly can be damaged. In any case, a rapid wear of the cylinder bore surface must be take into account, particularly if the liquid casting material is of aggressive nature.

OBJECTS OF THE INVENTION

It is an object of the invention to provide a valve assembly for diecasting moulds which does not have the disadvantageous mentioned herein before.

Particularly, it is an object of the invention to provide a valve assembly for diecasting moulds in which the kinetic energy to be absorbed by the pick up member is reduced to such an amount that it is just sufficient for initiating the closing operation of the venting valve.

SUMMARY OF THE INVENTION

To meet these and other objects, the invention provides a valve assembly for venting diecasting moulds, comprising a venting channel, a venting valve communicating with the venting channel and having an axially displaceable valve closure member.

There is provided an actuating means for operating the venting valve means from an open position into a closed position, whereby the actuating means includes a power pick up member exposed to the liquid casting material escaping during the casting operation from a casting chamber provided in the diecasting mould through the aforementioned venting channel. It is axially displaceable under the influence of the kinetic energy transmitted from the liquid casting material to the power pick up member when the liquid casting material hits the power pick up member.

The power pick up member is mechanically coupled to the axially displaceable valve closure member and includes an axially displaceable push member having an operating stroke whose length is limited to only a fraction of the length of the stroke performed by the axially displaceable valve closure member when it is driven from its open position to its closed position.

The axially displaceable valve closure member is adapted to freely move along a path in addition to the aforementioned operating stroke of the power pick up member. Finally, the actuating member further comprises a power transmission means for the transmission of the impact force exerted by the liquid casting material onto the power pick up member to the axially displaceable valve closure member of the venting valve.

With such a design, the kinetic energy of the power pick up member, due to its short operation stroke, can be kept within acceptable limits and absorbed without danger, even by a rigid stop member, without the need to provide expensive shock absorbing measures. The closure member of the venting valve which is set in motion by the impact or shock exerted to the power pick up member is freely displaced until it has reached its closed position. Since the non-positive coupling between the power pick up member and the closure member is released after the liquid casting material impacts the power pick up member, it can be ensured that the major portion of the path run by the power pick up member can be used to decelerate the power pick up member and to absorb the kinetic energy from the liquid casting material. The decelerating means required therefore, thus, can be much simpler than a shock absorbing means for the entire assembly according to the prior art which can be decelerated only at the end of the operating stroke of the valve closure member. The time required for closing the venting valve is not increased and is in the region of 1 msec.

In the case, as it is proposed according to a preferred embodiment, that the power pick up member is in the form of a floating piston displaceable in a cylinder communicating with the venting channel of the valve assembly, the portion of the cylinder wall exposed to the liquid casting material is very short due to the short operating stroke of the floating piston. Thus, the resulting solidified plug in front of the floating piston is very short and can be easily removed upon opening the two-part mould.

Due to the fact that the power pick up member has to run only a very short operating stroke, it is possible to provide a diaphragm member as power pick up member; preferably, this diaphragm member covers an opening of the venting channel of the valve assembly. Thereby, all possible disadvantages in connection with a piston member exposed to the liquid casting material are avoided.

As already mentioned, due to operational reasons, it is necessary to locate the power pick up member of the actuating assembly and the venting valve at different positions within the venting channel of the valve assembly. Thus, a direct power transmission between the power pick up member and the movable part of the venting valve usually cannot be realized. Due to this fact, according to a preferred embodiment, the valve assembly may comprise a driver plate member which is axially movable and coaxially arranged in relation to the power pick up member, a peripheral edge portion of the driver plate member positively engaging the plunger member of the venting valve and the driver plate member resting against the power pick up member under the influence of a spring member when the valve assembly is in its rest position.

The aforementioned actuating means further may comprises an actuating member which is operationally coupled to the axially displaceable valve closure member of the venting valve to keep the valve closure member in its closed position which it has reached under the influence of the transmission of the impact force exerted by the liquid casting material onto the power pick up member.

In order to decrease mechanical wear of the parts involved in operating the venting valve, the power transmission member is non-positively coupled to the axially displaceable push member and positively coupled to the axially displaceable valve closure member of the venting valve.

The venting valve may comprises a piston valve member including a plunger member whereby the power pick up member is located in parallel axial relationship with the plunger member.

For the practical realization of the power transmission means, different solutions are possible: It may comprise a driver plate member which is axially movable and coaxially arranged in relation to the power pick up member whereby a peripheral edge portion of the driver plate member positively engages the plunger member of the venting valve and the driver plate member rests against the power pick up member under the influence of a spring member when the valve assembly is in its rest position. Another possibility is that the power transmission means comprises a swiveling lever member positively engaging the plunger member of the venting valve, whereby the swiveling lever member rests against the power pick up member under the influence of a spring member when the valve assembly is in its rest position.

According to a preferred embodiment, the actuating member comprises an operating cylinder with a pneumatically or hydraulically driven operating piston, the operating piston being positively coupled with the axially displaceable closure member of the venting valve by means of a rigid interconnecting member.

The operating cylinder of the axially displaceable closure member may be provided with an inlet nozzle member having a nozzle bore and frontally projecting into the interior of the operating cylinder. Thereby, the nozzle bore is sealed by the facing front surface of the operating piston of the actuating member, and a spring member is provided in the interior of the operating cylinder to press the operating piston against the nozzle bore.

In order to ensure a reliable operation of the actuating assembly to keep the venting valve closed, the pressure of the hydraulic or pneumatic medium for the operating of the actuating member, the ratio between the cross section of the nozzle bore and the cross section of the front face of the operating cylinder sealing the nozzle bore, and the specifications of the spring member biasing the operating piston against the nozzle bore are chosen such that, the control valve member being in its closed position, the pressure of the hydraulic or pneumatic medium present in the inlet nozzle member and acting upon a portion of the front surface of the operating piston is not sufficient to open the control valve member, but such that, the control valve member having been mechanically opened, the pressure of the hydraulic or pneumatic medium now acting upon the entire area of the front surface of the operating piston is sufficient that the operating piston can close the venting valve means and keep it in its closed position.

It has been proven advantageous that the operating stroke of the push member be approximately one tenth of the length of the stroke performed by the axially displaceable valve closure member when it is driven from its open position to its closed position, preferably less than 1 mm and even more preferably in the region of 0.1 mm.

BRIEF DESCRIPTION OF THE DRAWINGS

In the following, some embodiments of the valve assembly according to the invention will be further described, with reference to the accompanying drawings, in which.

DETAILED DESCRIPTION OF THE PREFERRED EMBODIMENTS

The valve assembly 1 shown in the FIGS. 1 to 6 is contained in a rectangular parallelepiped-shaped two-part housing block comprising a back housing block portion 2 and a front housing block portion 3 having a plane front surface 5. In other words, the housing block of the valve assembly 1 is divided along a separating plane 4 into the two portions 2 and 3. The housing block 2, 3 is received in a recess provided in a mould portion 6 of a two-part mould consisting of the two mould portions 6 and 7 adapted to be pressed one against the other one, as is well known in the art. The position of the valve assembly 1 is at the outer border of the contacting surface 8 of the mould portion 6. The mould portions 6 and 7 are but partially shown in the drawings. The front surface 5 of the housing block 2, 3 flushes with the contacting surface 8 of the mould portion 6 such that the front surface 5 as well as the contacting surface 8 sealingly engages the contacting surface 9 of the other mould portion 7 once the mould 6, 7 has been closed.

Figure 1:
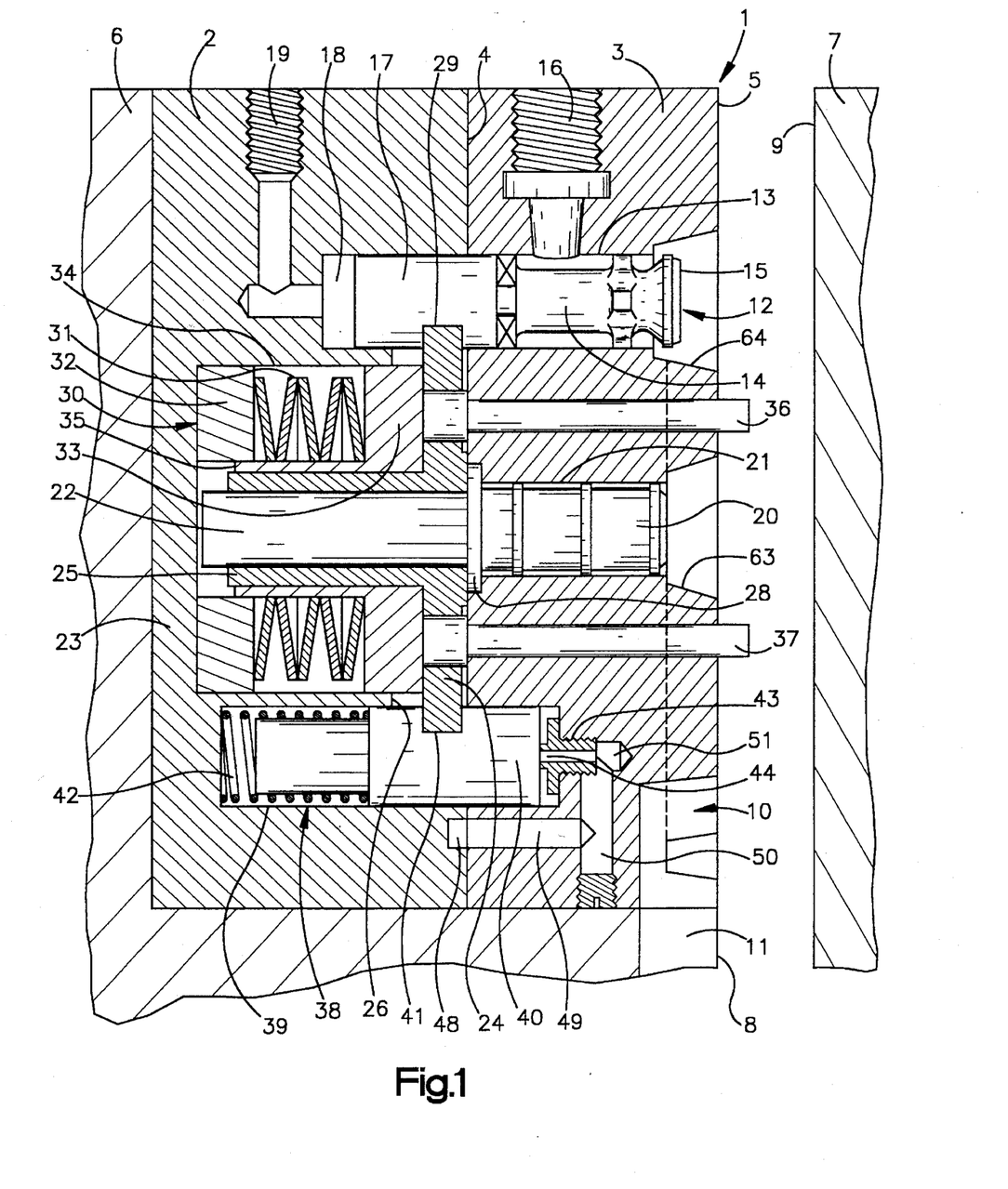
FIG. 1 shows a longitudinal sectional view of a first embodiment of a valve assembly, mounted to the one mould portion of a two-part mould which is shown in its open position.
Figure 2:
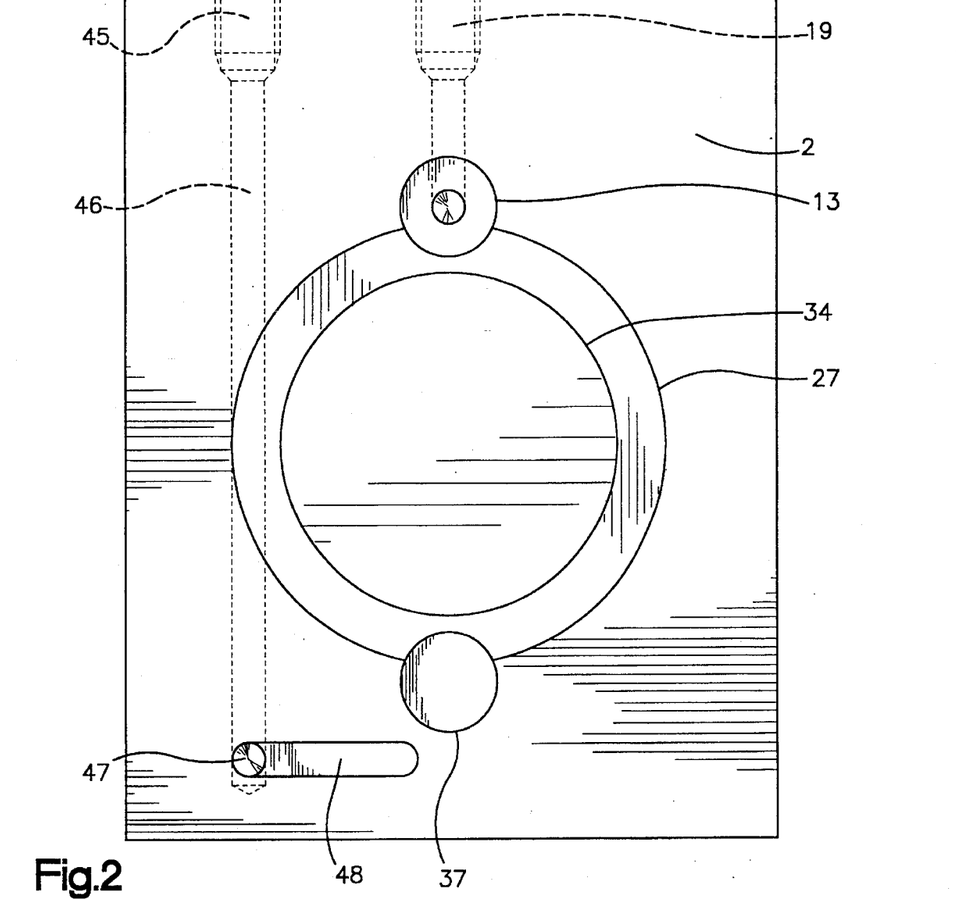
FIG. 2 shows a front view of a first portion of the housing block of the valve assembly according to FIG. 1.
Figure 3:
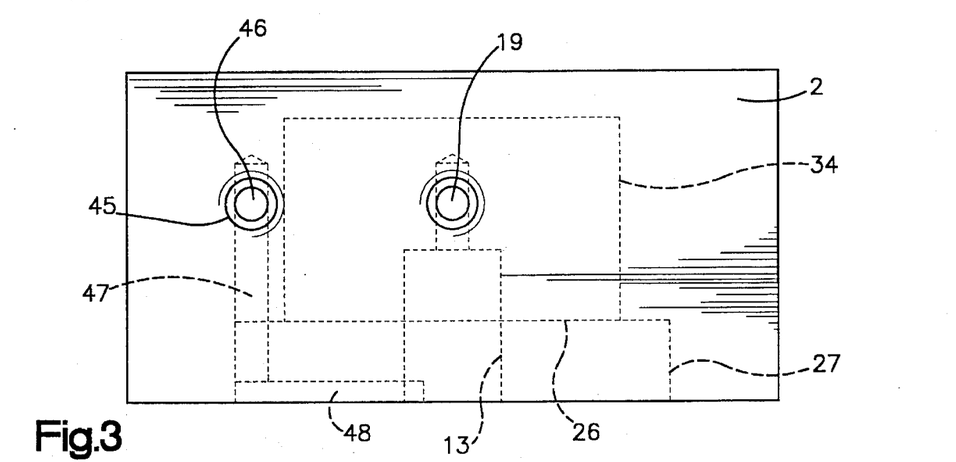
FIG. 3 shows a top view of the first portion of the housing block of the valve assembly according to FIG. 1.

The housing block 2, 3 may be fixed to the mould portion 6 by means of screw means not shown in the drawing. Similarly, the housing block portions 2 and 3 can be fixed to each other by screw means which also are not shown in the drawing.

The housing block portion 3 is provided with a venting channel generally designated with reference numeral 10; thereby, the venting channel 10 is open towards the front surface 5 of the housing block portion 3. This venting channel 10 of the valve assembly 1 will be described in detail in connection with FIG. 4 hereinafter. The venting channel 10 communicating with the casting chamber of the mould constitutes a continuation of a venting channel 11 provided in the mould portion 6 and being open towards the contacting surface 8 as well.

Figure 5:
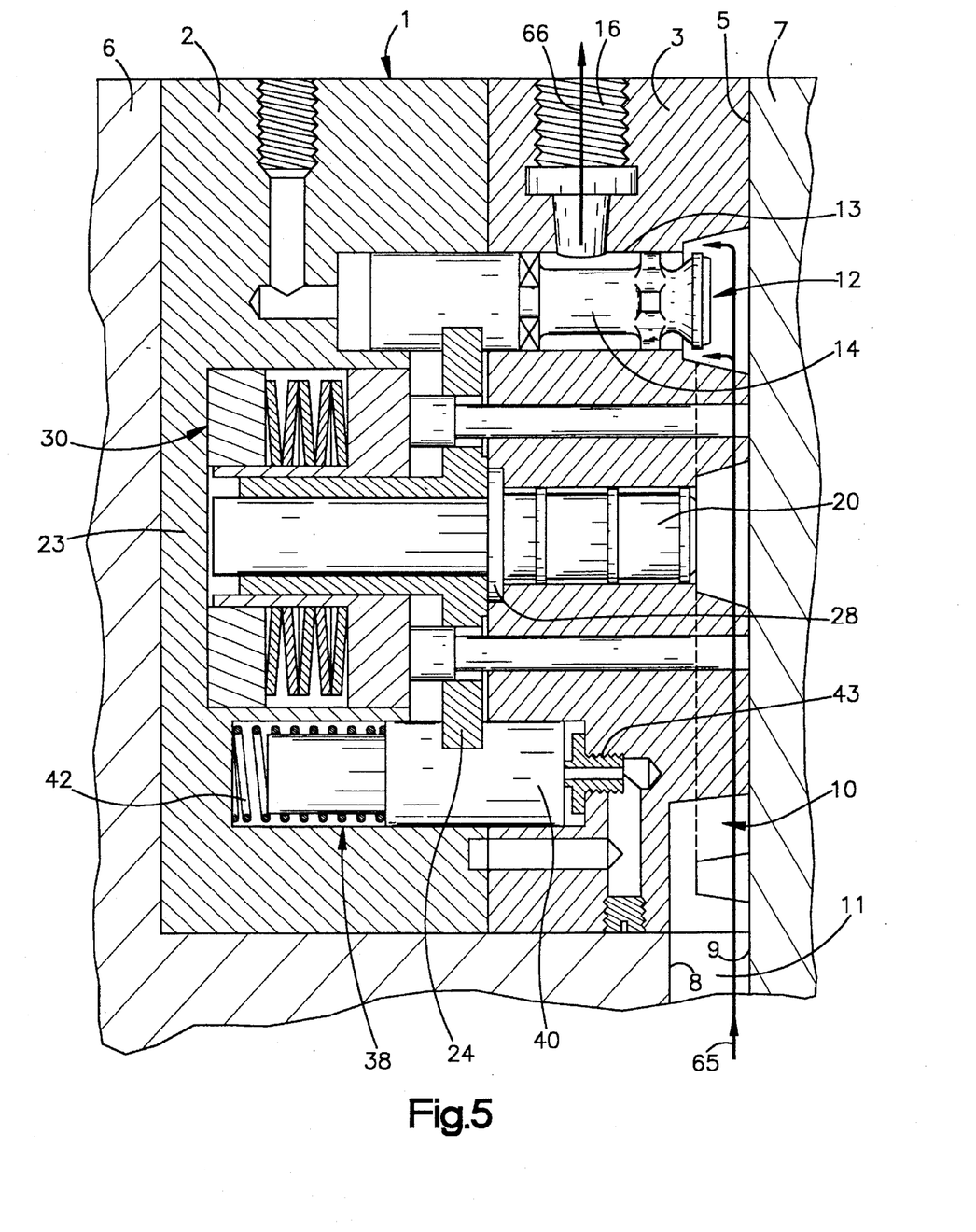
FIG. 5 shows a longitudinal sectional view of the valve assembly according to FIG. 1, the mould being in its closed position and the valve assembly being opened.
Figure 6:
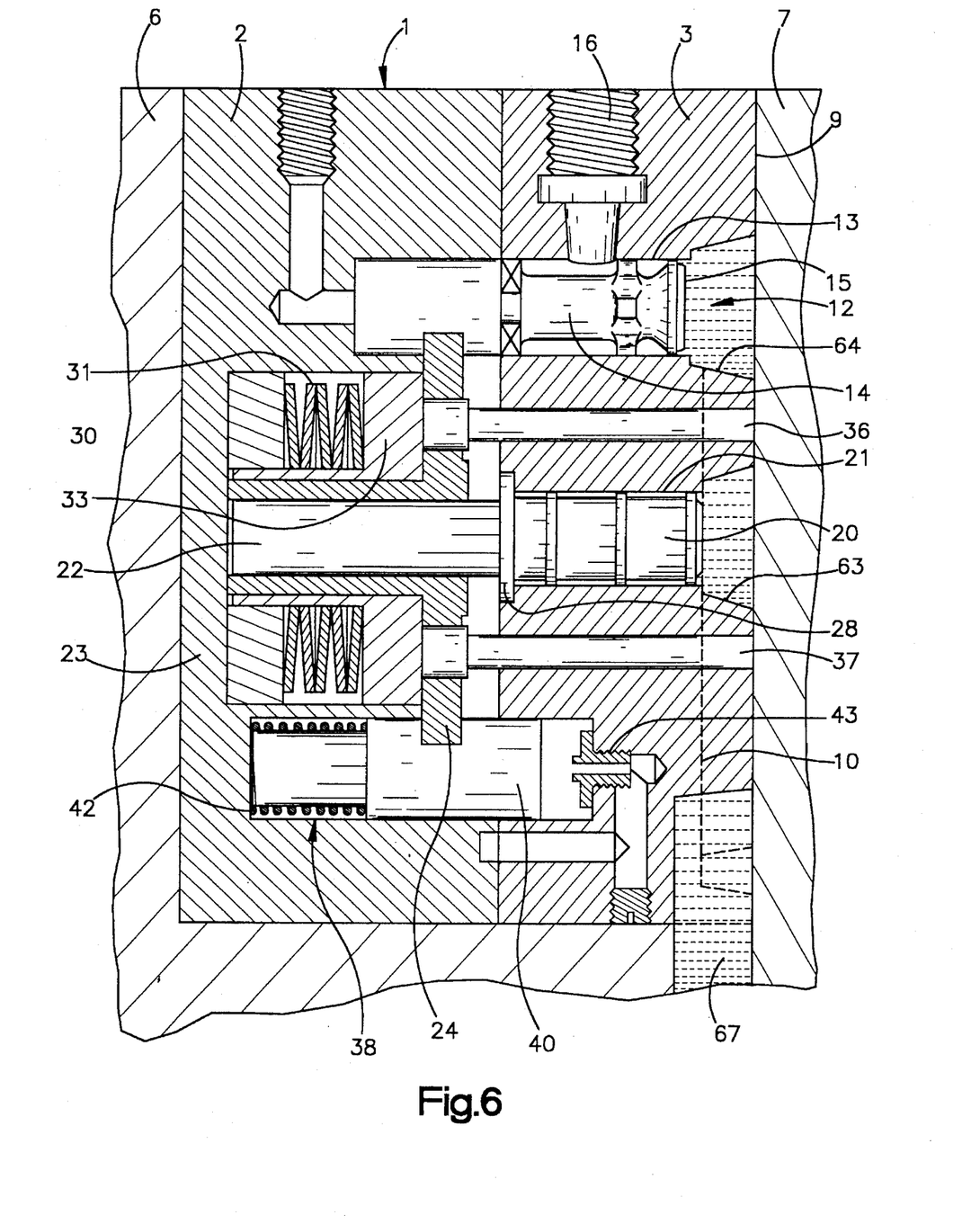
FIG. 6 shows a view similar to the one shown in FIG. 5, but with the valve assembly closed.

The venting valve 12 of the valve assembly 1 is designed as a plunger valve which is described, e.g., in Swiss Patent Specification Nr. 633,208. Its longitudinal axis runs perpendicular to the front surface 5 of the housing block 2, 3. The venting valve 12 comprises a valve cylinder 13 communicating with the venting channel 10 as well as a valve piston 14 longitudinally movable in the valve cylinder 13. The valve piston 14 is provided with a piston head 15 which penetrates into the venting channel 10 at the front side of the valve assembly 1 if the venting valve 12 is open (as shown in FIGS. 1 and 5). In order to close the venting valve 12, the piston head 15 is axially displaced into the interior of the valve cylinder 13 (as shown in FIG. 6). At the top of the housing block portion 3 there is provided an outlet channel 16 for the venting valve 12; connected to this outlet channel 16 is the suction pipe of a vacuum pump (not shown). A chamber 18 situated behind a rear cylindrical extension member 17 of the valve piston 14 communicates within the housing block portion 2 with a channel 19 leading to the atmosphere; thereby, it is possible to connect for instance a sensing means to the channel 19 for monitoring the correct operation of the valve assembly 1.

In order to close the venting valve 12, there is provided an operating assembly consisting of several different elements. The main part of this operating assembly is a displaceable power pick up means which is exposed to the casting material flowing from the casting chamber in the mould through the venting channel 11 into the venting channel 10. The aforementioned power pick up means is mechanically coupled to the valve piston 14 of the venting valve 12. According to the present invention, this power pick up means is in the form of a push member mounted to be displaceable along a short stroke and designed, in the present example, as a floating piston 20 displacably received in a operating cylinder 21 communicating with the venting channel 10. Thereby, the longitudinal axis of the operating cylinder 21 runs parallel to the longitudinal axis of the venting valve 12. The floating piston 20 is provided with a rear cylindrical extension member 22 which extends close to a rear wall 23 of the housing block portion 2. If the still liquid casting material penetrates the venting channel 11 and presses against the floating piston 20, the latter one is displaced until the extension member 22 abuts against the rear wall 23. Thereby, the stroke of the floating piston 20 is limited to an amount which is only a fraction of the closing stroke of the valve piston 14. e.g. a tenth.

For the transmission of the impact impulse from the floating piston 20 to the valve piston 14 of the venting valve 12, there is provided a power transmission means in the form of a driver plate 24. The driver plate 24 is mounted coaxially to the floating piston 20 and slidably received on its extension member 22 by means of a hub member 25. The axial stroke of the driver plate 24 is limited, on the one side by the housing block portion 3 at the separating plane 4 and, on the other side, by a shoulder 26 of a cylindrical recess (FIG. 1) in the housing block portion 2. The floating piston 20 is provided with a collar 28 which rests on the center of the driver plate 24 to nonpositively engage the latter during the operating stroke of the floating piston 20. The driver plate 24 engages at the position 29 of its circumferential edge a groove in the extension member 17 of the valve piston 14 and, thereby, is positively coupled to the valve piston 14.

For resetting the valve assembly 1 into its initial position as shown in FIG. 1, i.e. after a casting operation has been terminated, there is provided a spring assembly 30 incorporating a spring bank 31 consisting of a plurality of cup springs. The spring bank 31 is located between a stationary pressure plate 32 and a movable pressure plate 33 in the interior of a bore 34 of the housing block portion 2. The movable pressure plate 33 is provided With a sleeve-like extension member 35 which loosely surrounds the hub member 25 of the driver plate 24 and internally supports the springs of the spring bank 31. In order to bias the spring bank 31, two push rods 36 and 37 are provided which are slidably received in corresponding bores in the housing block portion 3 and in the driver plate 24 and which abut against the movable pressure plate 33 of the spring assembly 30. The push rods 36, 37 protrude over the front face 5 out of the housing block portion 3 and are pushed into the interior of the valve assembly 1 by means of the contacting surface 9 upon closing the mould by putting the two mould portions 6 and 7 together; thus, the spring assembly 30 is biased (FIG. 5).

Figure 4:
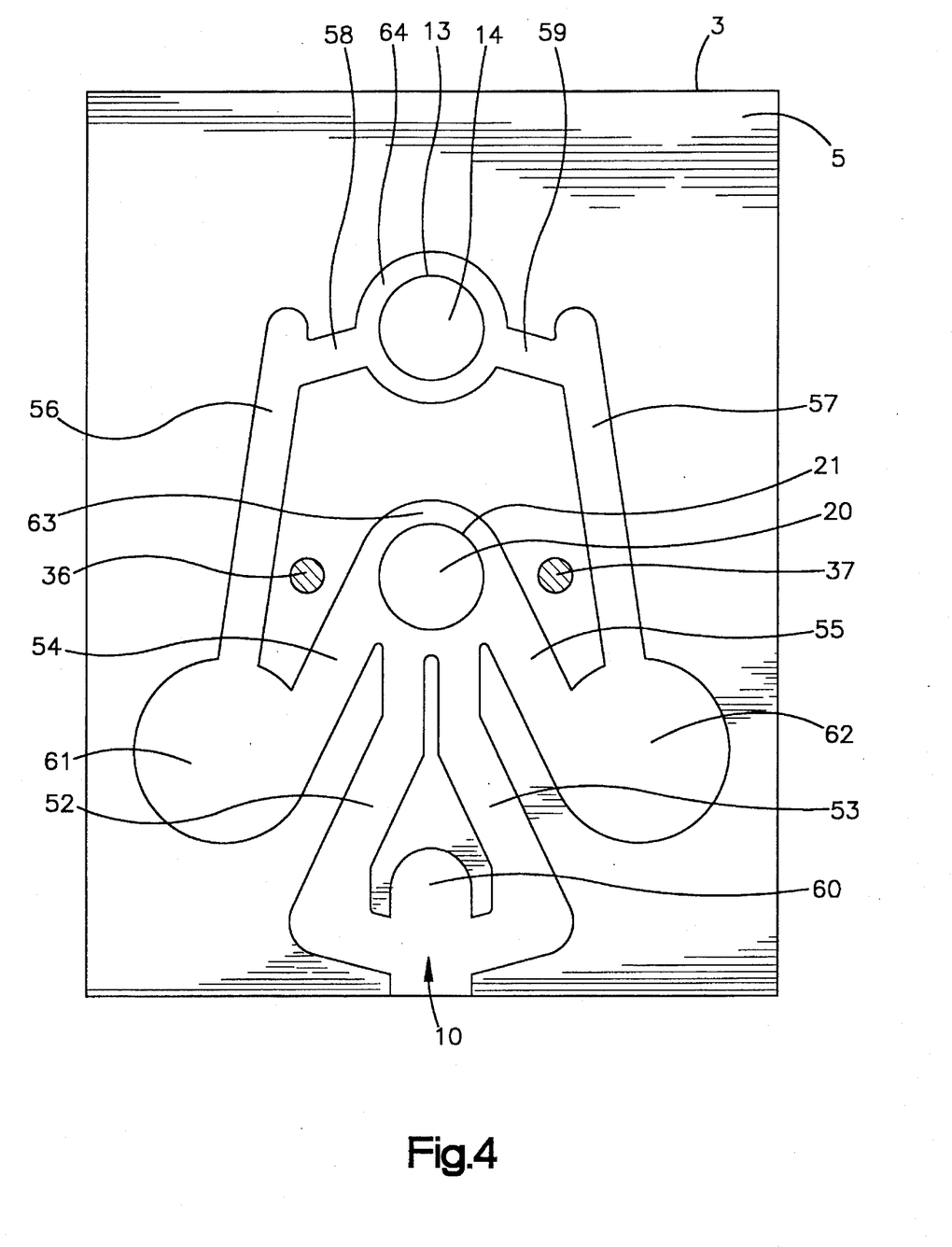
FIG. 4 shows front view of a second portion of the housing block constituting the frontal part of the valve assembly according to FIG. 1.

It must be noted that for the sake of clarity the two push rods 36 and 37 are shown in the drawings according to FIGS. 1, 5 and 6 to be in a common vertical plane; however, in fact, they are located in a common horizontal plane as can be seen from FIG. 4 in order to facilitate the shape and design of the venting channel 10.

The aforementioned operating assembly further includes an actuating member 38 which is operationally coupled with the valve piston 14 of the venting valve 12 in order to keep said valve piston 14 in its closed position once it has been brought into said closed position under the influence of the impact impulse transmitted by the floating piston 20. As already mentioned, the actuating member 38 is not absolutely required in any case of the application of such a valve assembly 1; however, the presence of the actuating member 38 may be helpful in numerous applications of a valve assembly according to the invention.

In the present example, the actuating member 38 comprises an operating cylinder 39 with a pneumatically or hydraulically operated operating piston 40 both arranged in parallel axial relationship with the venting valve 12. The operating piston 40 is positively coupled to the driver plate 24 in the same manner as the valve piston 14, namely by the engagement of the circumferential edge of the driver plate 24 at the position 41, opposite to the position 29, with a groove provided in the operating piston 40. In this manner, the operating piston 40 of the actuating member 38 and the valve piston 14 of the venting valve 12 are positively coupled by means of the driver plate 24 which forms a rigid interconnecting link.

The operating piston 40 of the actuating member 38 is under the influence of a spring member 42 which, the spring assembly 30 being in a biased condition, presses the driver plate 24 against the collar 28 of the floating piston 20 and simultaneously keeps the valve piston 14 of the venting valve 12 in its open position. The pneumatic or hydraulic impingement on the operating piston 40 generally is effected by means of a control valve member operated by the floating piston 20 of the venting valve 12. Due to the rigid connection between valve piston 14 of the venting valve 12 and the operating piston 40 of the actuating member 38, it has been proven advantageous to provide a poppet valve serving as the aforementioned control valve member whereby the operating piston 40 of the actuating member 38 serves as the valve head. In this sense, the operating cylinder 39 of the actuating member 38 is provided with an inlet nozzle 43 projecting frontally into the cylinder chamber whereby the operating piston 40 seals the nozzle aperture 44 with its facing front surface under the influence of the spring member 42. The hydraulic or pneumatic pressure medium is supplied to the inlet nozzle 43, according to FIGS. 1, 2 and 3, via an inlet opening 45 (FIG. 2, 3), via channels 46, 47 and 48 provided in the interior of the housing block portion 2 and via channels 49, 50 and 51 provided in the interior of the housing block portion 3.

The pressure of the hydraulic or pneumatic pressure medium for the operation of the actuating member 38, the relation between the free cross sectional area of the inlet nozzle 43 and the cross sectional area of the operating piston 40 and the specifications of the spring member 42 acting on the operating cylinder 40 are chosen such that, the control valve being closed, the pressure of the hydraulic or pneumatic pressure medium present in the inlet nozzle 43 and impinging onto a portion of the front surface of the operating piston 40 is not sufficient to open the control valve, but simultaneously such that the aforementioned pressure is sufficient, the control valve having been mechanically opened, to enable the operating piston 40 to close the venting valve 12 and to keep it in its closed position due to the pressure exerted to the entire front surface of the operating piston 40.

The venting channel 10 of the valve assembly 1 comprises a plurality of channel branches 52 to 59 and chambers 60 to 62 which, in their entity, serve, as is well known, to collect splashes leading the compact flow of liquid casting material, to increase the impact pressure exerted onto the floating piston 20 and to delay the flow of the liquid casting material to the venting valve 12. From a collecting chamber 60 located at the inlet of the venting channel 10, the two channel branches 52 and 53 lead to an enlarged portion 63 situated in the region and in front of the operating cylinder 21 of the push member. From this enlarged portion 63, the next two channel branches 54 and 55 lead each to a delaying chamber 61 and 62, respectively. Therefrom, the further channel branches 56, 58 and 57, 59, respectively, lead to a further enlarged portion 64 situated in the region and in front of the venting valve 12.

FIG. 5 shows the valve assembly 1 in the starting position. The diecasting mould is closed, i.e. the mould portion 7 sealingly contacts with its contacting surface 9 the contacting surface 8 of the mould portion 6 and the front surface 5 of the valve assembly 1, respectively. Due to the closing of the diecasting mould, the spring assembly 30 has been biased under the influence of the push rods 36 and 37. The venting valve 12 is still in its open position due to the influence of the spring member 42 of the actuating member 38, with the result that air displaced out of the casting chamber of the mould may escape in the direction of the arrows 65 and 66 via the venting channel 11 of the diecasting mould, via the venting channel 10 of the valve assembly 1 and via the opened venting valve 12 through the outlet channel 16. The control valve 40, 43 of the actuating member 38 still is closed.

At the end of a casting operation, the liquid casting material escaping out of the casting chamber of the diecasting mould through its venting channel 11 penetrates the venting channel 10 of the valve assembly 1 and flows through the channel branches 52, 53 (FIG. 4) to the floating piston 20 of the actuating assembly. Under the heavy impact of the liquid casting material hitting the front surface of the floating piston 20, the floating piston 20 is abruptly displaced toward the stop member of its extension member 22 at the rear wall 23 of the housing block portion 2. The collar 28 provided at the floating piston 20 transmits this impact to the driver plate 24 which is, under the influence of the kinetic energy relayed by the floating piston 20, released from the collar 28 of the floating piston 20 as soon as the latter one has reached its final position. Then, the driver plate 24, together with the valve piston 14 of the venting valve 12 and the operating piston 40 of the actuating member 38, are thrown further, against the force of the spring member 42 of the actuating member 38. Thereby the venting valve 12 is brought into its closed position because the valve piston 14 thereof is displaced into the interior of the valve cylinder 13. The closing motion of the venting valve 12 is supported by the operating piston 40 of the actuating member 38 because the front surface of the operating piston 40, once it has been displaced under the influence of the impact on the floating piston 20, is under the full influence of the pressure medium entering the cylinder chamber 39 through the nozzle 43. Thus, its force directed in closing direction (to the left in FIG. 1) is transmitted by means of the driver plate 24 to the valve piston 14 of the venting valve.

FIG. 6 shows the situation of the valve assembly 1 when liquid casting material 67, coming from the casting chamber of the mould through the venting channel 10, has reached the enlarged portion 63 in the region of the floating piston and, shortly thereafter (e.g. after less than 1 msec) also the enlarged portion 64 in the region of the valve piston 14 of the venting valve 12. During this short period, i.e. before the liquid casting material also has reached the enlarged portion 64 in the region of the valve piston 14, the venting valve 12 is already closed, whereby the valve piston 14 has reached its final closed position in the manner as described just hereinbefore. Thus, it is ensured that the liquid casting material flowing through the channels 56 to 59 to the enlarged portion 64 cannot get into the interior of the venting valve 12 and into the outlet channel 16.

The end of the path of displacement of the actuating assembly is reached as soon as the driver plate 24 hits against the movable pressure plate 33 of the biased spring assembly 30. By means of the operating cylinder 40 of the actuating member 38, which still is under pressure, the valve piston 14 of the venting valve 12 is kept in its closed position with the help of the driver plate 24. As can be seen in FIG. 6, the liquid casting material 67 can penetrate the cylinder 21 of the floating piston 20 and, after the aforementioned short period, the cylinder 13 of the venting valve 12 only by a very limited amount; consequently, the removal of the rigid casting material out of the venting channel 10 presents no difficulties.

Upon opening the diecasting mould, i.e. upon separating the two mould portions 6 and 7 from each other, the spring assembly is released since the two push rods 36 and 37 are no longer fixed in their previous position by the contacting surface 9 of the mould portion 7. Thus, under the influence of the biased spring bank 31, the spring assembly 30 pushes the driver plate 24 and, therewith, the valve piston 14 of the venting valve 12 and also the operating piston 40 of the actuating member 38 as well as finally the floating piston 20 back into their initial positions as shown in FIG. 1. Simultaneously, the head 15 of the valve piston 14 and the front surface of the floating piston 20 push the portions of the rigid casting material out of the enlarged portions 63 and 64 with the result that the entire rigid portion of casting material in the venting channel 10 is removed therefrom. Moreover, also the control valve 40, 43 for the operation of the actuating member 38 is closed again.

Figure 7:
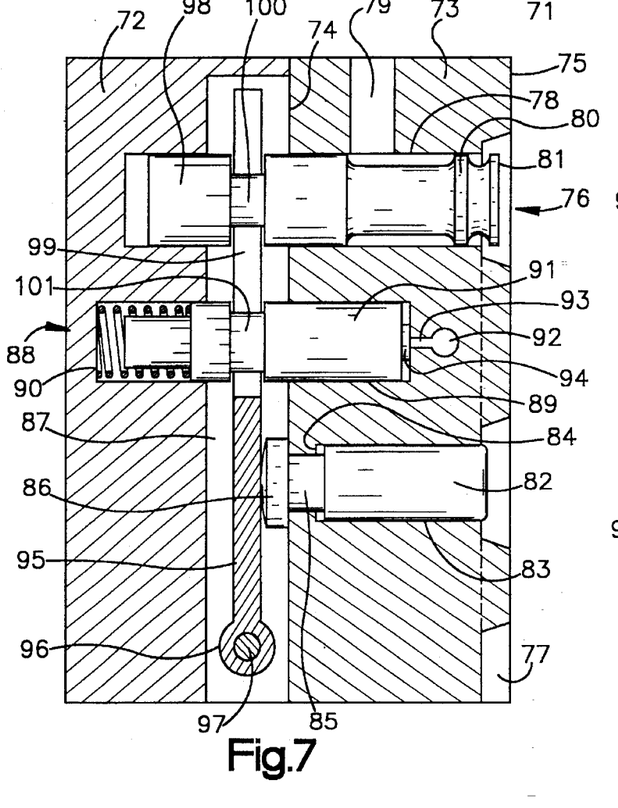
FIG. 7 shows a longitudinal sectional view of a second embodiment of the valve assembly according to the invention.
Figure 8:
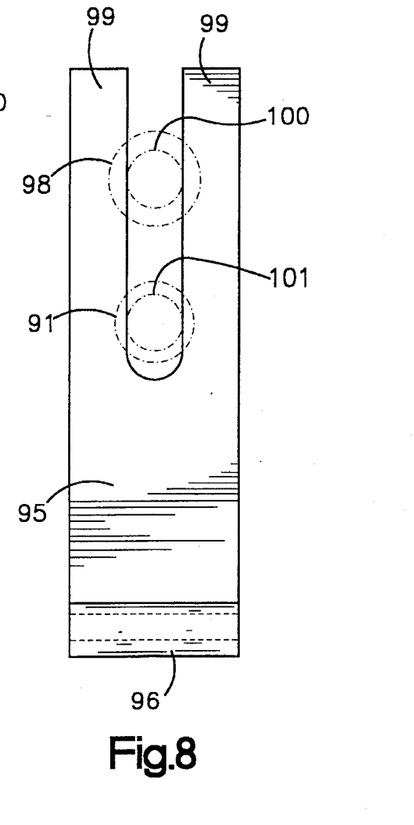
FIG. 8 shows a detail of the embodiment shown in FIG. 7.

In FIGS. 7 and 8, there is shown a view of a somewhat different design of the valve assembly according to the invention in a slightly smaller scale. The valve assembly 71 according to FIGS. 7 and 8 is contained as well in a rectangular parallelepiped-shaped housing block 72, 73. The said housing block is subdivided, along a separating plane 74, into a rear housing block portion 72 and a front housing block portion 73 which latter one comprises a plane front surface 75. In a manner similar to the one explained in connection with the embodiment according to FIGS. 1–6, the valve assembly 71 may be fixed to a mould portion of a (not shown) multi-part diecasting mould.

As a venting valve 76, this embodiment comprises in a similar manner a piston valve including a valve cylinder 78 communicating with an outlet channel 79 and being connected to a venting channel 77 and an axially displaceable plunger 80 having a plunger head 81. As a push member, again a floating piston 82 is provided whose front surface is exposed to the liquid casing material. The floating piston is axially displaceable in an operating cylinder 83 and the stroke thereof being limited by a shoulder 84 provided in the operating cylinder 83. The rear end of the floating piston 82 is provided with a push rod extension 85 incorporating a push rod head 86; said push rod head 86 is located in a recess of the rear housing block portion 72 and it rests, in its non-operative position, against the separating plane 74 of the front housing block portion 73. The actuating member 88 is designed similar to the actuating member 38 discussed in connection with FIG. 1 and comprises an operating cylinder 89 with an operating piston 91 biased by a spring member 90. It is understood that, in the rest position, the spring member 90 forces the operating piston 91 to its right-most position as shown in FIG. 7. The operating piston 91 maybe exposed to a hydraulic or pneumatic pressure medium which is forced into the operating cylinder 89 via a channel 92 through an inlet nozzle 93. A front-sided extension member 94 on the operating piston 91 closes the aperture of the nozzle 93, if the assembly is in its rest position, and forms, together with the aforementioned nozzle 93, a control valve for the pneumatic or hydraulic operation of the operating piston 91.

Contrary to the design shown in and discussed with reference to FIGS. 1–6, in this embodiment, the transmission of the impact force exerted onto the floating piston 82 to the plunger 80 of the venting valve 76 and to the operating piston 91 of the actuating member 88 is not performed by means of a linearly displaceable power transmission member (driver plate 24), but by means of a swiveling lever 95 located in the recess 87 of the housing block portion 72 and pivotally connected to a swiveling axis 97 by means of an articulation head member 96. The swiveling lever 95 is positively connected to a rear extension member 98 of the plunger 80 of the venting valve 76 and to the operating piston 91 of the actuating member 88. For this purpose, the swiveling lever 95 has a fork-like design at its one end, the two arms 99 at its free end (cf. FIG. 8) each laterally engage a peripheral groove 100 and 101, respectively, provided on the aforementioned extension member 98 and on the operating piston 91. It is understood that this engagement, in view of the swiveling motion of the lever 95, is realized with the required clearance between the arms 99 and the grooves 100 and 101, respectively.

Speaking in a general sense, the mode of operation of the valve assembly according to FIGS. 7 and 8 is similar to the one of the valve assembly according to FIGS. 1–6. Thus, if the floating piston 82 is exposed to the arriving liquid casting material penetrating the venting channel 77, the floating piston, which can perform but a very limited stroke, throws the swiveling lever 95 away with the result that the venting valve 76 is closed and is kept in its closed position by means of the actuating member 88.

Figure 9:
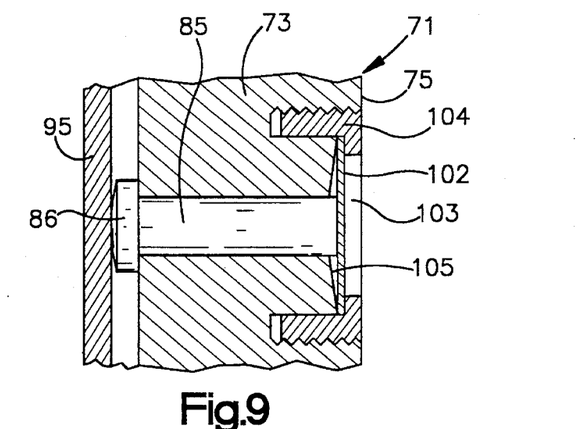
FIG. 9 shows a detail of the embodiment shown in FIG. 7, but modified according to a third embodiment of the valve assembly.

In FIG. 9, there is shown a variant of the embodiment according to FIGS. 7 and 8. In place of the floating piston 82 according to FIG. 8, there is provided a diaphragm member 102 serving as a push member; said diaphragm member 102 covers a mouth 103 of the venting channel at the front surface 75 of the valve assembly 71 and is connected to the housing block portion 73 by means of an annular nut 104. The push rod member 85 which also is provided with a push rod head 86 cooperating with the swiveling lever 95 extends, in this example, up to the diaphragm member 102. In the housing block portion 73, immediately behind the diaphragm member 102, a slightly conically shaped stop surface 105 is provided which limits the stroke of the diaphragm member 102 to such an amount which is only a fraction of the stroke to be passed-by the valve piston 80 (FIG. 7).

It is understood that the aforementioned design with a diaphragm member could also be used, instead of the floating piston 20, in an embodiment according to FIGS. 1–6.

What is claimed is:

1. A valve assembly for venting diecasting moulds, comprising:

a venting channel means;

a venting valve means communicating with said venting channel means and having an axially displaceable valve closure member;

an actuating means for operating said venting valve means from an open position into a closed position;

said actuating means including a power pick up means exposed to liquid casting material escaping during the casting operation from a casting chamber provided in said diecasting mould through said venting channel means and being axially displaceable under the influence of the kinetic energy transmitted from said liquid casting material to said power pick up means when said liquid casting material hits said power pick up means;

said power pick up means being mechanically coupled to said axially displaceable valve closure member;

said power pick up means including an axially displaceable push member having an operating stroke whose length is limited to only a fraction of the length of the stroke performed by said axially displaceable valve closure member when it is driven from its open position to its closed position;

said axially displaceable valve closure member being adapted to freely move along a path in addition to said operating stroke of said power pick up means;

said actuating means further comprising a power transmission means for the transmission of the impact force exerted by said liquid casting material onto said power pick up means to said axially displaceable valve closure member of said venting valve means.

2. A valve assembly according to claim 1 in which said actuating means further comprises an actuating member which is operationally coupled to said axially displaceable valve closure member of said venting valve means and adapted to keep said valve closure member in its closed position which it has reached under the influence of the transmission of the impact force exerted by said liquid casting material onto said power pick up means.

3. A valve assembly according to claim 2 in which said actuating member comprises an operating cylinder with a pneumatically or hydraulically driven operating piston, said operating piston being positively coupled with said axially displaceable closure member of said venting valve means by means of a rigid interconnecting member.

4. A valve assembly according to claim 3 in which said operating piston of said actuating member is hydraulically or pneumatically pressurized via a control valve member which is operated by said axially displaceable power pick up means of said venting valve means.

5. A valve assembly according to claim 4 in which said control valve member is a poppet valve whereby the operating piston of said actuating member serves as the valve head of said poppet valve.

6. A valve assembly according to claim 4 in which said operating cylinder of said actuating member is provided with an inlet nozzle member having a nozzle bore and frontally projecting into the interior of said operating cylinder, and in which said nozzle bore is sealed by the facing front surface of said operating piston of said actuating member, whereby a third spring means is provided in the interior of said operating cylinder to press said operating piston against said nozzle bore.

7. A valve assembly according to claim 6 in which the pressure of the hydraulic or pneumatic medium for the operating of said actuating member, the ratio between the cross section of said nozzle bore and the cross section of the front face of said operating cylinder sealing said nozzle bore, and the specifications of said spring means biasing said operating piston against said nozzle bore are such that, the control valve member being in its closed position, the pressure of said hydraulic or pneumatic medium present in said inlet nozzle member and acting upon a portion of the front surface of said operating piston is not sufficient to open said control valve member, but such that, the control valve member having been mechanically opened, the pressure of said hydraulic or pneumatic medium now acting upon the entire area of the front surface of the operating piston is sufficient that the operating piston can close said venting valve means and keep it in its closed position.

8. A valve assembly according to claim 1 in which said power pick up means comprises a floating piston member which is axially displaceable in an operating cylinder communicating with said venting channel means.

9. A valve assembly according to claim 1 in which said power pick up means comprises a diaphragm member which covers a mouth of said venting channel means.

10. A valve assembly according to claim 1 in which said power transmission means is non-positively coupled to said axially displaceable push member and positively coupled to said axially displaceable valve closure member of said venting valve means.

11. A valve assembly according to claims 10 in which said power transmission means comprises a driver plate member which is axially movable and coaxially arranged in relation to said power pick up means, a peripheral edge portion of said driver plate member positively engaging said plunger member of said venting valve means and said driver plate member resting against said power pick up means under the influence of a first spring means when said valve assembly is in its rest position.

12. A valve assembly according to claim 11 in which said actuating means comprises an actuating member, said actuating member further comprises an operating cylinder with an pneumatically or hydraulically driven operating piston in which said operating cylinder of said actuating member is arranged in parallel axial relationship with said power pick up means, and in which said power transmission means is positively coupled with said axially displaceable closure member of said venting valve means as well as with said operating piston of said actuating member.

13. A valve assembly according to claim 12 in which said axially displaceable closure member of said venting valve means and said operating piston of said actuating member are operatively coupled to said driver plate member at diametrically opposite sides thereof.

14. A valve assembly according to claim 10 in which said power transmission means comprises a swiveling lever member positively engaging said plunger member of said venting valve means, said swiveling lever member resting against said power pick up means under the influence of a second spring means when said valve assembly is in its rest position.

15. A valve assembly according to claim 1 in which said venting valve means comprises a piston valve member including a plunger member whereby said power pick up means is located in parallel axial relationship with said plunger member.

16. A valve assembly according to claim 1 further comprising an operating cylinder having a rear wall, said push member being received in said operating cylinder such that the distance between said push member and said rear wall is approximately one-tenth of the distance said axially displaceable valve closure member travels when it is driven from its open position to its closed position, such that the operating stroke of said push member is approximately one tenth of the length of the stroke performed by said axially displaceable valve closure member when it is driven from its open position to its closed position.

\* \* \* \* \*